United States Patent
Seo

(10) Patent No.: US 10,993,247 B2
(45) Date of Patent: Apr. 27, 2021

(54) METHOD FOR CONFIGURING RESOURCES, FOR DIRECT D2D COMMUNICATION, ON BASIS OF CONGESTION CONTROL IN WIRELESS COMMUNICATION SYSTEM AND DEVICE THEREFOR

(71) Applicant: LG Electronics Inc., Seoul (KR)

(72) Inventor: Hanbyul Seo, Seoul (KR)

(73) Assignee: LG Electronics Inc., Seoul (KR)

(*) Notice: Subject to any disclaimer, the term of this patent is extended or adjusted under 35 U.S.C. 154(b) by 166 days.

(21) Appl. No.: 16/346,632

(22) PCT Filed: Nov. 1, 2017

(86) PCT No.: PCT/KR2017/012231
§ 371 (c)(1),
(2) Date: May 1, 2019

(87) PCT Pub. No.: WO2018/084556
PCT Pub. Date: May 11, 2018

(65) Prior Publication Data
US 2020/0068593 A1 Feb. 27, 2020

Related U.S. Application Data

(60) Provisional application No. 62/419,944, filed on Nov. 9, 2016, provisional application No. 62/417,296, filed (Continued)

(51) Int. Cl.
*H04W 72/12* (2009.01)
*H04W 72/10* (2009.01)
(Continued)

(52) U.S. Cl.
CPC ......... *H04W 72/1247* (2013.01); *H04L 43/16* (2013.01); *H04L 47/14* (2013.01);
(Continued)

(58) Field of Classification Search
CPC . H04W 72/1263; H04W 76/36; H04W 72/10; H04W 47/14; H04L 43/16
See application file for complete search history.

(56) References Cited

U.S. PATENT DOCUMENTS

2016/0150520 A1 5/2016 Fodor et al.
2018/0206260 A1* 7/2018 Khoryaev ............. H04W 72/02

FOREIGN PATENT DOCUMENTS

EP 3504897 7/2019
IN 201937009301 4/2019
(Continued)

OTHER PUBLICATIONS

PCT International Search Report and Written Opinion in international Application No. PCT/KR2017/012231, dated Feb. 5, 2018, 18 pages (with English translation).
(Continued)

*Primary Examiner* — Gbemileke J Onamuti
(74) *Attorney, Agent, or Firm* — Fish & Richardson P.C.

(57) ABSTRACT

Disclosed is a method for a terminal transmitting a sidelink data channel in a wireless communication system. Particularly, the method comprises a step for transmitting a sidelink data channel having a first priority. The sum if resources which can be used for all sidelink data channels having a priority equal to or lower than the first priority is equal to or less than a threshold corresponding to the first priority.

20 Claims, 9 Drawing Sheets

Related U.S. Application Data on Nov. 3, 2016, provisional application No. 62/416,125, filed on Nov. 1, 2016.

(51) Int. Cl.
   *H04W 76/36* (2018.01)
   *H04L 12/801* (2013.01)
   *H04L 12/26* (2006.01)
   *H04W 92/18* (2009.01)

(52) U.S. Cl.
   CPC ....... *H04W 72/10* (2013.01); *H04W 72/1263* (2013.01); *H04W 76/36* (2018.02); *H04W 92/18* (2013.01)

(56) References Cited

FOREIGN PATENT DOCUMENTS

| RU | 2533166 | 11/2014 |
|---|---|---|
| WO | WO 2016/022849 | 2/2016 |
| WO | WO2016024890 | 2/2016 |
| WO | WO2018062832 | 4/2018 |

OTHER PUBLICATIONS

Intel Corporation, "Sidelink congestion control for V2X services," R1-1609459, 3GPP TSG RAN WG1 Meeting #86bis, Lisbon, Portugal, Oct. 10-14, 2016, 5 pages.

Qualcomm Incorporated, "Congestion control for V2V," R1-1609960, 3GPP TSG-RAN WG1 #86bis, Lisbon, Portugal, Oct. 10-14, 2016 14 pages.

Nokia, Alcatel-Lucent Shanghai Bell, "On congestion control for V2V communication," R1-1609788, 3GPP TSG RAN WG1 Meeting #86bis, Lisbon, Portugal, Oct. 10-14, 2016, 2 pages.

LG Electronics, "Discussion on congestion control for PC5-based V2X," R1-1609187, 3GPP TSG RAN WG1 Meeting #86bis, Lisbon, Portugal, Oct. 10-14, 2016, 3 pages.

$3^{rd}$ Generation Partnership Project; NEC; "Discussions on congestion control in distributed scheduling mode," R1-1609141, 3GPP TSG RAN WG1; Lisbon, Portugal; dated Oct. 2016, 7 pages.

Extended European Search Report in European Application No. 17866952.9, dated Apr. 3, 2020, 9 pages.

Russian Office Action in Russian Application No. 2019114426, dated Mar. 20, 2020, 12 pages (with English translation).

IN Office Action in Indian Appln. No. 201927014357, dated Jan. 28, 2021, 6 pages (with English translation).

* cited by examiner (A) CONTROL-PLANE PROTOCOL STACK (B) USER-PLANE PROTOCOL STACK D2D signal transmission
from UE to which resource unit #0
is allocated

METHOD FOR CONFIGURING RESOURCES, FOR DIRECT D2D COMMUNICATION, ON BASIS OF CONGESTION CONTROL IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/012231, filed on Nov. 1, 2017, which claims the benefit of U.S. Provisional Application No. 62/419,944, filed on Nov. 9, 2016, U.S. Provisional Application No. 62/417,296, filed on Nov. 3, 2016, and U.S. Provisional Application No. 62/416,125, filed on Nov. 1, 2016. The disclosures of the prior applications are incorporated by reference in their entirety.

TECHNICAL FIELD

The present invention relates to a wireless communication system, and more particularly, to a method of configuring a resource for Device-to-Device (D2D) direct communication based on Congestion contRol (CR) in a wireless communication system and apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, the technical task of the present invention is to propose a method of configuring a resource for UE-to-UE direct communication based on Congestion Control (CR) in a wireless communication system and apparatus therefor.

Technical Solutions

In one technical aspect of the present invention, provided herein is a method of transmitting a sidelink data channel by a user equipment in a wireless communication system, the method including transmitting the sidelink data channel of a first priority, wherein a sum of resources usable for all sidelink data channels having priorities equal to or lower than the first priority is equal to or smaller than a threshold corresponding to the first priority.

In another technical aspect of the present invention, provided herein is a user equipment in a wireless communication system, the user equipment including a wireless communication module and a processor connected to the wireless communication module so as to transmit a sidelink data channel of a first priority, wherein a sum of resources usable for all sidelink data channels having priorities equal to or lower than the first priority is equal to or smaller than a threshold corresponding to the first priority.

Preferably, a sum of resources usable for a sidelink data channel having a second priority lower than the first priority and all sidelink data channels having priorities equal to or lower than the second priority may be equal to or smaller than a threshold corresponding to the second priority. Here, an amount of a resource capable of using the first priority for the sidelink data channel may be greater than that of a resource capable of using the second priority for the sidelink data channel.

More preferably, a resource usable for a sidelink data channel having a third priority lower than the second priority may be equal to or smaller than a threshold corresponding to the third priority and the third priority may be a lowest priority.

In such a case, thresholds corresponding to the first priority, the second priority and the third priority may be configured individually.

Additionally, if the sum of the resources usable for the all sidelink data channels having the priorities equal to or lower than the first priority is greater than the threshold corresponding to the first priority, the sidelink data channel of the first priority may be dropped.

Advantageous Effects

According to an embodiment of the present invention, it is able to allocate a D2D direct communication resource efficiently based on congestion control.

It will be appreciated by persons skilled in the art that that the effects that can be achieved through the present invention are not limited to what has been particularly described hereinabove and other advantages of the present invention will be more clearly understood from the following detailed description.

BEST MODE FOR INVENTION

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

The term 'Base Station (BS)' may be used to cover the meanings of terms including Remote Radio Head (RRH), evolved Node B (eNB or eNode B), Reception Point (RP), relay, etc.

Figure 1:
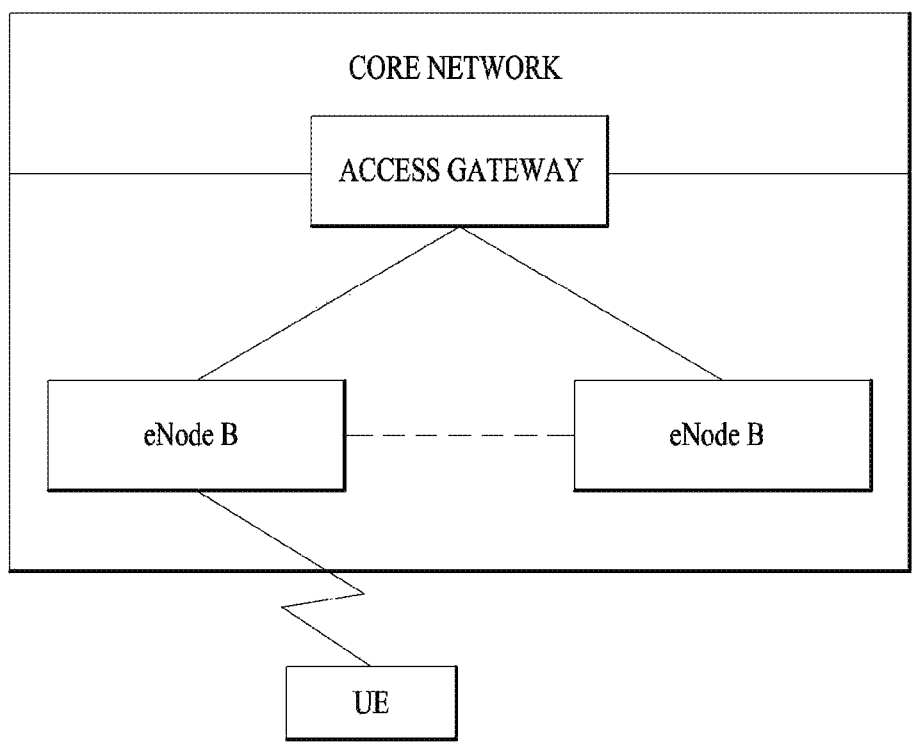
FIG. 1 illustrates a configuration of an Evolved Universal Mobile Telecommunications System (E-UMTS) network as an example of a wireless communication system.
Figure 2:
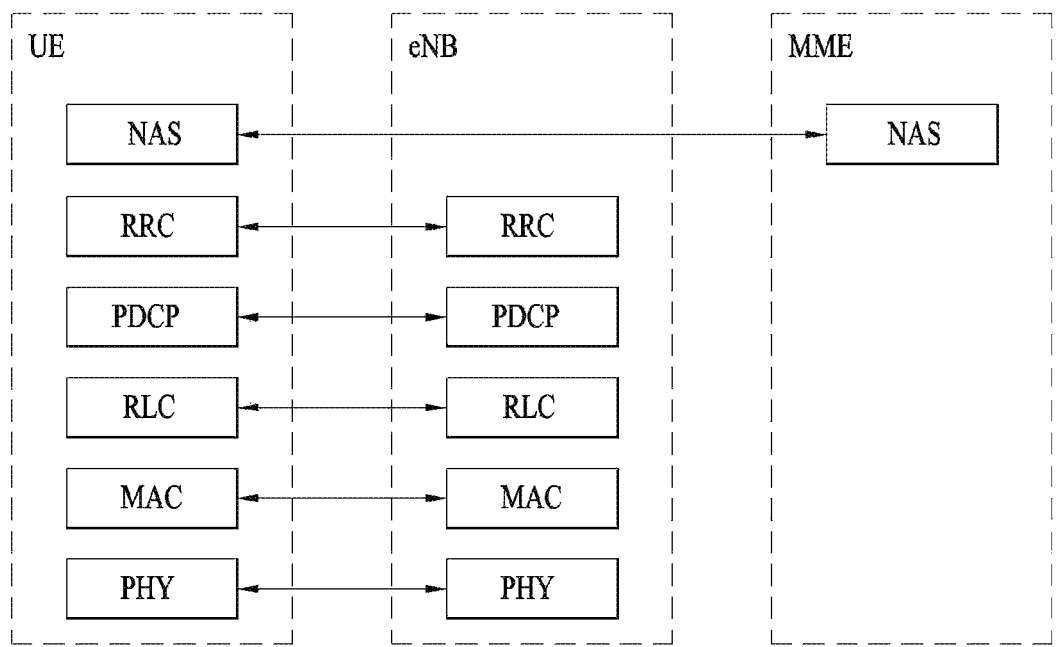
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).
Figure 2:
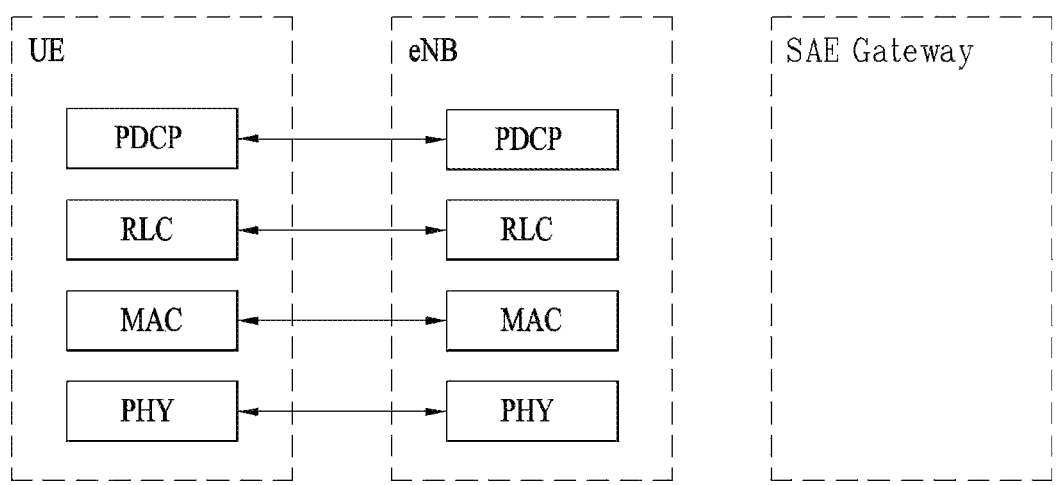

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

One cell constituting an eNB is configured to use one of bandwidths of 1.25, 2.5, 5, 10, 15, and 20 MHz and provides a DL or UL transmission service to multiple UEs. Different cells may be configured to provide different bandwidths.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
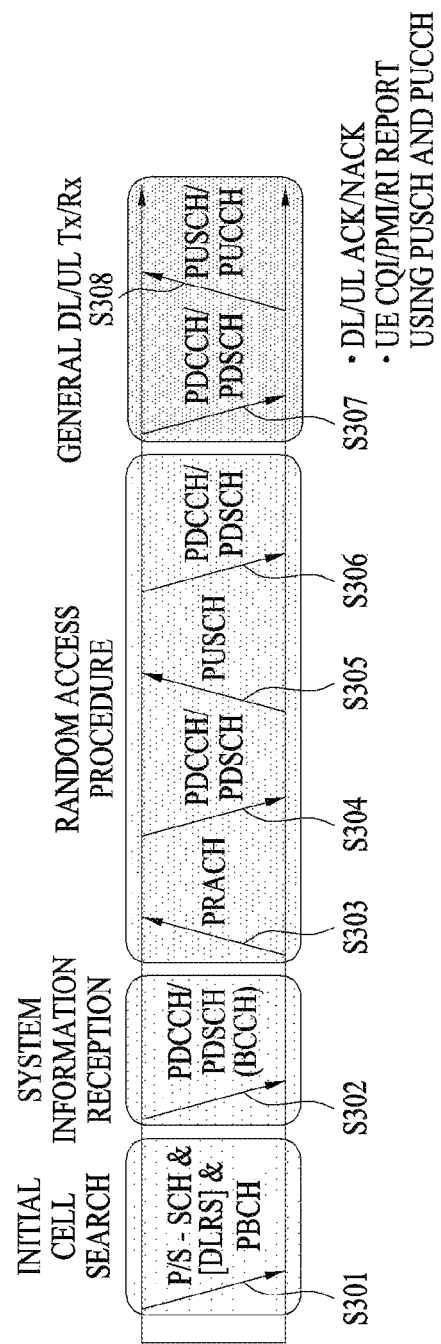
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
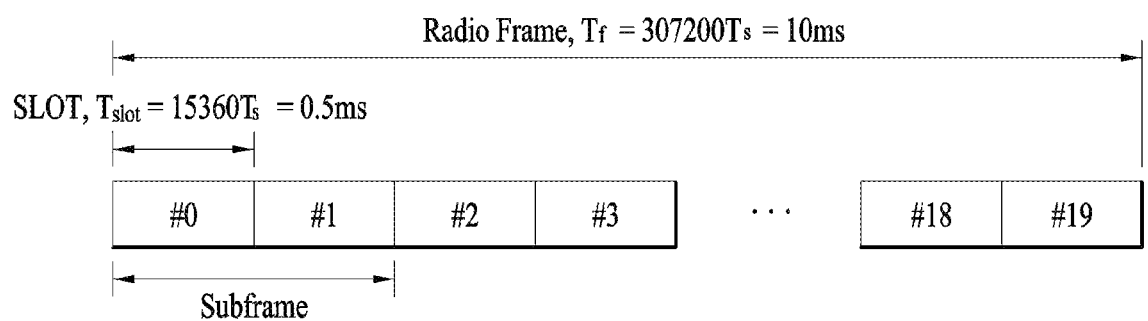
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms (327200×$T_s$) long and divided into 10 equal-sized subframes. Each subframe is 1 ms long and further divided into two slots. Each time slot is 0.5 ms (15360×$T_s$) long. Herein, $T_s$ represents a sampling time and $T_s=1/(15\ \text{kHz}\times2048)=3.2552\times10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
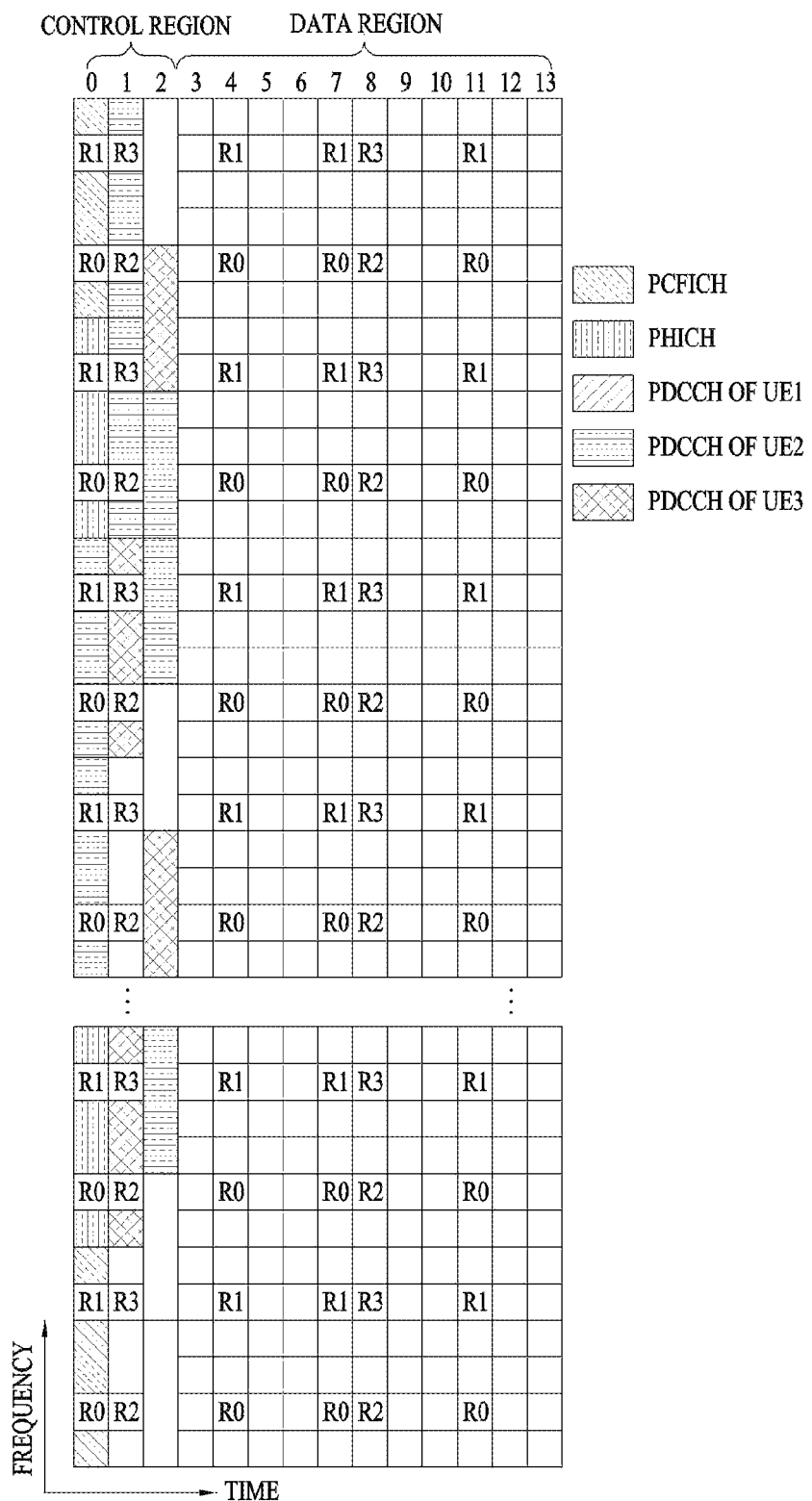
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A"

and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
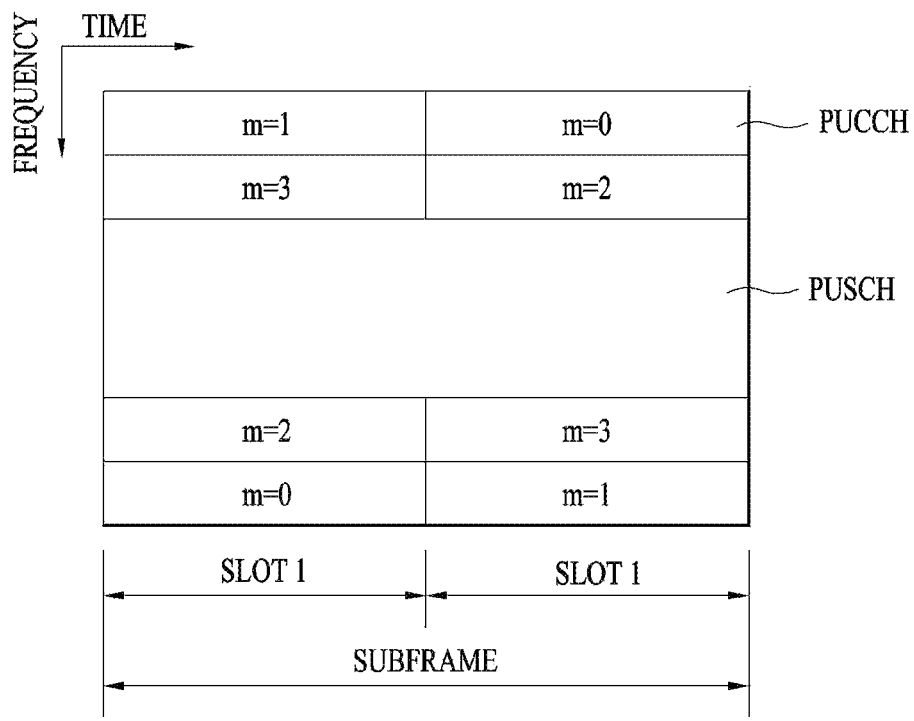
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
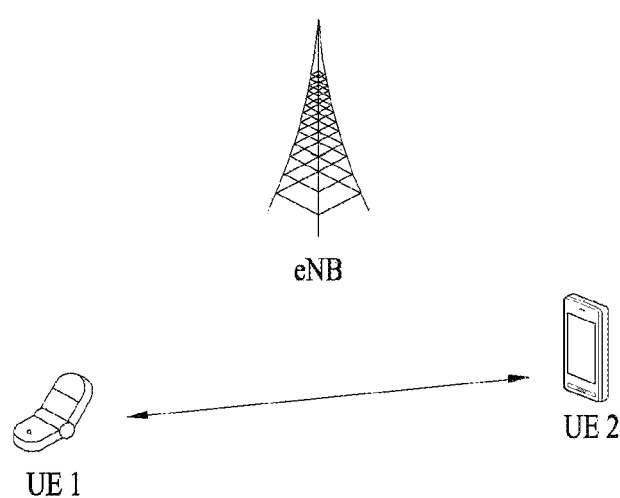
FIG. 7 is a diagram illustrating the concept of device-to-device (D2D) communication.

FIG. 7 is a diagram illustrating the concept of device-to-device (D2D) communication.

Referring to FIG. 7, during D2D communication (i.e., D2D direct communication) in which the UE wirelessly communicates with another UE, the eNB may transmit a scheduling message for indicating D2D transmission/reception. The UE participating in D2D communication may receive a D2D scheduling message from the eNB, and performs Tx/Rx operations indicated by the D2D scheduling message. Here, although a UE means a user terminal, a network entity such as an eNB may be regarded as a UE when transmitting and receiving a signal according to a communication method between UEs.

Hereinafter, a link between UEs is referred to as a D2D link and a link for communication between a UE and an eNB is referred to as an NU link. Or, a link directly connected between UEs may be referred to as a SideLink (SL) in the concept compared with an uplink or a downlink.

Described in the following is a case for a UE1 to select a resource unit corresponding to a specific resource from a resource pool, which means a set of a series of resources, and transmit a sidelink signal using the corresponding resource unit. Here, the resource pool may be announced by a base station if the UE1 is located within the coverage of the base station. If the UE1 is located out of the coverage of the base station, the resource pool may be announced by another UE or determined as a predetermined resource. Generally, a resource pool is configured with a plurality of resource units, and each UE may select one or a plurality of resource units and then use the selected resource unit(s) for a sidelink signal transmission of its own.

Figure 8:
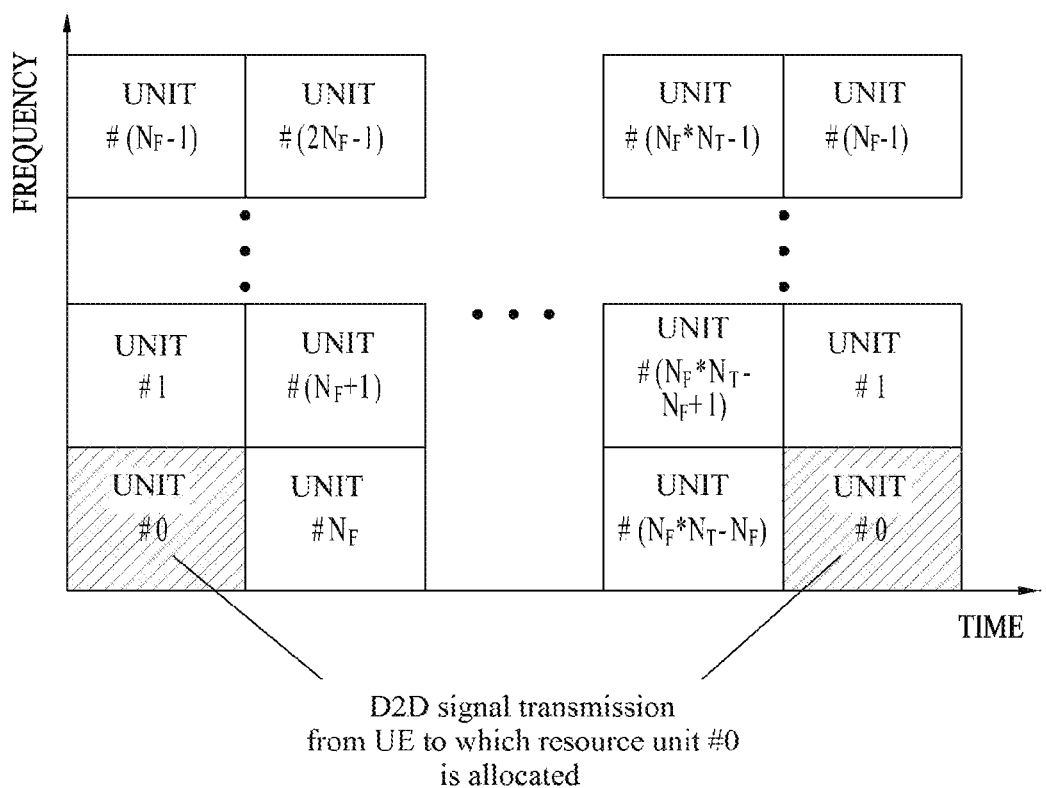
FIG. 8 illustrates an exemplary configuration of a resource pool and a resource unit.

FIG. 8 shows a configuration example of a resource pool and a resource unit.

Referring to FIG. 8, an entire frequency resource is divided into $N_F$ and an entire time resource is divided into $N_T$, whereby total $N_F * N_T$ resource units can be defined. Particularly, a corresponding resource pool may be repeated by period of $N_T$ subframes. Typically, a single resource unit may appear periodically and repeatedly. Or, in order to obtain a diversity effect in a time or frequency dimension, an index of a physical resource unit having a single logical resource unit mapped thereto may change in a previously determined pattern according to time. In such a resource unit structure, a resource pool may mean a set of resource units that can be used for a transmission by a UE intending to transmit a sidelink signal.

The above-described resource pool may be subdivided into various types. First of all, it can be classified according to a content of a sidelink signal transmitted on a resource pool. For example, like 1) to 3) in the following, a content of a sidelink signal may be classified into a sidelink data channel and a discovery signal. And, a separate resource pool may be configured according to each content.

1) Scheduling Assignment (SA): This refers to a signal including resource location information of a sidelink data channel followed by a transmitting (Tx) UE and information such as Modulation and Coding Scheme (MCS) for demodulation of a data channel, an MIMO transmission scheme and the like. The SA can be transmitted in a manner of being multiplexed with sidelink data on the same resource unit. In this case, an SA resource pool may mean a pool of resources on which SA is transmitted by being multiplexed with sidelink data.

2) Sidelink data channel: This refers to a channel used for a Tx UE to transmit user data. If SA is transmitted by being multiplexed with sidelink data on a same resource unit, a Resource Element (RE) used in transmitting SA information on a specific resource unit of an SA resource pool may be used to transmit sidelink data on a sidelink data channel resource pool.

3) Discovery signal: This means a resource pool for a signal enabling a neighboring UE to discover a Tx UE in a manner that the Tx UE transmits information such as its own ID and the like.

4) Synchronization signal/channel: This may be referred to as a sidelink synchronization signal or a sidelink broadcast channel, and mean a resource pool for a signal/channel for a receiving (Rx) UE to achieve a goal of matching time/frequency synchronization with a Tx UE in a manner that the Tx UE transmits a synchronization signal and information relevant to synchronization.

Although SA and sidelink data can use a resource pool separated on a subframe, if a UE is able to transmit SA and sidelink data in a single subframe simultaneously, two kinds of resource pools may be configured in the same subframe.

In some implementations, when a UE determines a sidelink transmission resource by itself, the UE also determines a size and frequency of a resource used by the UE by itself. Of course, due to constraint condition from a network or the like, restriction may be put on using a resource size of frequency over a predetermined level. Yet, in a situation that many UEs gather in a specific area at a specific timing, if all UEs use a relatively large amount of resources, interference may be caused among them, thereby degrading overall performance considerably.

Hence, if an individual UE observes a channel status and determines that many resources are consumed excessively, the corresponding UE preferably takes an action of reducing a resource use of its own. This is defined as Congestion contRol (CR). For example, a UE may determine whether energy measured from a unit time/frequency resource is equal to or higher than a predetermined level and then adjust an amount and frequency of a transmission resource of its own according to the ratio of the unit time/frequency resource from which the energy equal to or higher than the predetermined level is observed. The ratio of the unit time/frequency resource from which the energy equal to or higher than the predetermined level is observed is defined as a Channel Busy Ratio (CBR).

In some implementations, a single UE may transmit a plurality of traffics in sidelink. For example, a UE installed in a car announces its basic location information by specific periods, thereby enabling a nearby car to determine whether to collide. And, the UE also informs the nearby car of information obtained by the UE from sensors and the like by different periods, thereby helping another car to obtain a situation. Or, if a specific incident occurs, the UE can perform an operation of informing a nearby car of the occurrence of the incident by other periods. Thus, traffics of different types may differ from each other in priority with respect to radio resource allocation.

As a method of processing a plurality of the aforementioned traffics, it may be able to consider that a single UE transmits information through a plurality of sidelink processes. Here, a single sidelink process means a unit of transmitting a traffic on a resource determined through a series of resource selections. In a single sidelink process, a UE may transmit a plurality of PDUs using a selected resource several times repeatedly. Alternatively, the UE may use a selected resource for a transmission of a single PDU only without using the selected resource repeatedly. In case of transmitting a single PDU, a UE may select a plurality of time resources as transmission resources, which is for HARQ retransmission of a single PDU.

In such a situation, a CR preferably operates to adjust a resource use in a UE unit. Namely, each UE determines a size and frequency of a resource to use according to a CBR and then appropriately distributes the determined resource to a plurality of sidelink processes again. Particularly, each UE induces a maximum value of an amount of a time/frequency resource usable for a transmission in a unit time such as 1 second from a CBR. The maximum value of the amount of the time/frequency resource induced from the CBR is determined as Target Resource Utilization (TRU). Thereafter, the TRU is divided again into an amount that will be used by each sidelink process. Here, a more resource amount can be allocated to a sidelink process of a high priority in consideration of a priority that each sidelink process has.

For example, in a situation that a specific UE is determined to use 80 RBs per 1 second as a CBR measurement result, if the corresponding UE attempts to operate a sidelink process 1 of a high priority and a sidelink process 2 of a low priority simultaneously, the corresponding UE can allocate a resource, which can be used by the corresponding UE, to two sidelinks like the following examples. In the following examples, resources are assumed as allocated to two sidelink processes at the ratio of 3:1. And, a size or frequency of a resource used by each sidelink process may be determined depending on an attribute of a traffic applied to a corresponding sidelink process.

Example 1: A UE transmits a sidelink process 1 using 60 RBs per 1 second once and also transmits a sidelink process 2 using 20 RBs per 1 second once. In doing so, the total resources used per 1 second by the corresponding UE becomes 80 RBs (=60*1+20*1).

Example 2: A UE transmits a sidelink process 1 using 6 RBs per 100 ms once and also transmits a sidelink process 2 using 2 RBs per 100 ms once. In doing so, the total resources used per 1 second by the corresponding UE becomes 80 RBs (=6*10+2*10).

Example 3: A UE transmits a sidelink process 1 using 12 RBs per 200 ms once and also transmits a sidelink process 2 using 10 RBs per 500 ms once. In doing so, the total resources used per 1 second by the corresponding UE becomes 80 RBs (=12*5+10*2).

Example 4: A UE determines to use a sidelink process 1 only and transmits the sidelink process 1 using 8 RBs per 100 ms once. In doing so, a sidelink process 2 is not used. If necessary, all traffics are transmitted on the sidelink process 1 by being multiplexed.

Meanwhile, in case that a plurality of Protocol Data Units (PDUs) are transmitted in a manner that a resource selected once in a single sidelink process is used repeatedly, a UE also determines that the selected-once resource will be used until when. For example, when a UE selects a resource, the UE randomly selects how many times the selected resource will be used in a predetermined range. Unless a special situation (e.g., a case that a transmission on a pre-selected resource is impossible due to a sudden change of a message size, etc.) occurs, a resource of a corresponding sidelink process is not changed before a resource is used as many as a selected count.

To implement this, when a UE selects a resource, the UE sets a prescribed counter to a specific value. The UE decrements the prescribed counter by 1 each time a PDU is transmitted (or, each time a transmission resource timing arrives). Then, if the counter reaches 0, the UE may perform a process for selection of other resources. Through such an operation, other UEs may estimate what kind of resource will be used by the corresponding UE and operate to avoid an overlapping resource as far as they can.

In this case, a CBR value measured by a UE is changed. As a result, the UE may need to adjust a size or frequency of a resource used by the UE according to a CR. Yet, as a counter for a selected-once resource is set to 0, if a size of frequency of a resource is adjusted before a new resource selection is made, this may work as an obstacle to an operation for another UE to avoid a future resource of the corresponding UE. Hence, in a state that a resource is selected for a specific sidelink process, even if a UE needs to adjust a size and frequency of a resource due to a change of a CBR measurement value and the like, the UE may operate to preferentially use a resource consistently as many times as a count for the corresponding sidelink process to use the resource (i.e., to continue to use a previously selected resource until a counter of the corresponding sidelink process becomes 0). Once the counter becomes 0, a resource reselection is performed. In this case, it is able to determine an appropriate size and frequency of a resource by reflecting a result of CR.

Although a counter of a specific sidelink process becomes 0, when a UE operates to determine whether to maintain an existing resource stochastically, if the UE determines to maintain the existing resource, the UE can maintain a size and frequency of the existing resource without still reflecting a result of CR according to a new CBR. Or, if this results in reflecting a new CBR result with an excessively long delay, when a CBR result changes over a predetermined level, the UE may operate to perform a resource reselection instantly irrespective of a stochastic selection and reflect the CBR result, the moment the counter becomes 0.

The aforementioned method is based on the principle of maximally utilizing the principle of maintaining an existing resource selection. Yet, as a CBR changes considerably, if an instant CR needs to be performed, it may cause bad influence to performance. As a complement to this, if a CBR changes over a predetermined level or a ratio of a resource usable by a UE changes over a predetermined level as a result of CBR, although a use of a resource selected by a specific sidelink process does not expire yet, the UE may operate to perform a resource reselection on the corresponding sidelink process. Particularly, such an operation may be limitedly applicable to a situation that a UE should reduce a size of frequency of a resource due to an increment of CBR. Namely, as a CBR is decremented, if it is able to increase a size of frequency of a resource, system performance has no problem despite that an existing resource is maintained.

In some implementations, in a situation that a UE transmits data by operating a plurality of sidelink processes, a resource selection and reselection operation should be separately operated per sidelink process. For example, a counter for determining how many times a selected resource will be used is separately determined per sidelink process and should operate in a manner of being decremented by 1 only if a PDU is transmitted on the corresponding sidelink process or a transmission resource corresponding to the corresponding sidelink process arrives. This means that using a resource selected by a specific sidelink process until when is separated so as not to be affected by a PDU transmission on another sidelink process.

Additionally, an amount of a resource necessary for each UE may differ depending on a situation. For instance, a UE necessary to transmit traffics of many types in sidelink may also require more resources in a congestion situation in comparison with a UE unnecessary to transmit such traffics. Hence, a different TRU may be determined depending on a type of a UE. For example, after each UE has determined a nominal TRU on the assumption that all UEs generate the same amount of traffic, it is able to finally determine a TRU that the corresponding UE will use actually by reflecting UE-specific information on the nominal TRU (e.g., by reflecting a predetermined weight). Such a value may be delivered/determined in an authentication process of a UE in advance (i.e., determined to use a bigger TRU if a UE allowing more resources is authenticated). Or, the UE may report a necessary amount to a network such as a base station or the like and then have an appropriate value designated.

Under circumstances, a UE may not be able to measure a CBR for a resource pool transmitted by the UE. For example, in a situation that a transmission resource pool to be used by a UE is changed, until a CBR is stably measured for a changed new transmission resource pool, the UE is unable to perform an operation based on a CBR for the corresponding resource pool. In this case, since a sensing operation for general resource collision avoidance is impossible as well, the UE can temporarily transmit data using an exceptional resource pool that is used in case that sensing is impossible.

For example, in case that a UE performs a transmission on a resource pool of a new cell by handover or that a UE is unable to continue to use a resource due to an unstable communication link with a base station despite that the resource is allocated to the UE from the base station, the UE can use an exceptional resource pool. Thus, since a UE is not aware of a CBR value in case of using an exceptional resource pool, the UE should define whether to determine a transmission parameter by assuming a prescribed situation. As a method, since an exceptional resource pool will be used by a UE in a special situation only, assuming that a congestion situation does not occur on the assumption that a probability of a congestion situation occurrence will be very low, a UE may operate to determine a transmission parameter in a situation of no restriction from CBR. Or, a base station or the like announces a nominal CBR value or a CBR value (e.g., a CBR value of an exceptional resource pool measured directly by a base station) measured through another method, and a UE may operate to determine a transmission parameter on the assumption of the announced value.

In some implementations, in a situation that a UE reserves a future resource, if a size of a message is changed, the UE may need to reselect a resource. For instance, as a message (or, an integrated message of integrating a plurality of messages to be transmitted) is increased more than expected, if it is unable to send the message despite using a highest Modulation and Coding Scheme (MCS), a UE may operate to send a message in a manner of taking a bigger resource by reselecting a resource. Yet, this operation should be limited to a situation that congestion does not occur. Namely, as a congestion situation occurs, if a UE already reduces a resource and configures a resource to match up with the aforementioned TRU, it is impossible to send a big message, which cannot be sent using the configured resource, using any schemes. In this case, if a resource is reselected, a reserved resource is cancelled unnecessarily, whereby a resource collision probability will increase.

Therefore, as a size of a message increases, when the corresponding message may not be fully transmitted on a reserved resource, if a CBR value is equal to or lower than a predetermined level, a full message transmission is attempted through a bigger resource reservation. Yet, if the CBR value is higher than the predetermined level, an existing reserved resource can be maintained. By operating in such a manner, despite failing to transmit a full message, a UE may operate to transmit a partial message on an existing resource without resource collision with another UE. In doing so, a partial message that cannot be transmitted may be dropped, and priority information of a message may be reflected by the dropping operation. For example, a message of a low priority can be preferentially dropped. Here, the low priority means that a value corresponding to a priority is big. For example, when there are a message having a priority value of 1 and a message having a priority value of 2, the message having the priority value of 1 has a high priority.

Meanwhile, when a single UE transmits a packet of a different priority, it may be advantageous that an amount of a resource usable per priority is differently adjusted depending on a situation. Namely, if a congestion situation occurs, a packet of a low priority is transmitted using a very small amount of resource only. On the contrary, a packet of a high priority is allowed to use a more amount of resource. As a method for implementing this, a TRU derived from the aforementioned CBR, i.e., a maximum value of an amount of a time/frequency resource usable by each UE for a transmission in a unit time such as 1 second can be set differently according to a priority of a packet.

Particularly, after TRU_a has been defined, it is set as a TRU of a packet corresponding to a priority level a. Generally, it will be preferable that a high priority occupies a bigger TRU. Hence, if a priority a is higher than a priority b, TRU_a can be set to have a value greater than TRU_b. Namely, if an amount of resource usable by a packet of priority a for a unit time is RU_a, RU_x is regulated to be equal to or smaller than TRU_x for all priority level x.

And, if priority a is higher than priority b, it becomes TRU_a≥TRU_b.

Yet, if TRU is applied additionally despite that RU that is an amount of resource usable per priority is calculated separately, although one UE is in a situation that there is no more resource to be used for a high priority level, another UE transmits a low priority, thereby consistently increasing load of a system.

For example, assume that each UE has priorities of two types, priority a and priority b and that TRU_a=1% and TRU_b=0.5% are determined in a given congestion situation. As many packets of priority a are generated for UE1, if there occurs a situation that RU of 1.5% is necessary, RU that is an amount of resource used for a unit time can eventually become 1% only in the aforementioned operation, whereby an amount corresponding to ⅓ of the entire priority-a packets cannot be transmitted. On the other hand, if a priority-b packet is not generated for the UE1, total RU of the UE1 may be limited to 1%.

Yet, as priority-a packet and priority-b packet are appropriately generated for UE2, it may be able to assume that transmission is possible with RU 1% and RU 0.5%. In this case, RU that is an amount of resource used by the UE2 for a unit time becomes 1.5%. Moreover, as RU of 0.5% is used for the transmission of the priority b, it may be inappropriate in that the UE1 drops the packet of the priority a in the same situation to prevent a congestion situation.

As a method for resolving it, it is able to regulate that a sum of RUs for packets having a series of priorities is equal to or smaller than a sum of TRUs given to the corresponding priorities. And, between the RU-summed priorities, ab actual RU is flexibly assigned to each priority. For example, if regulation is applied in a manner that RUs between priority a and priority b are summed, it operates in a manner that RU_a+RU_b becomes equal to or smaller than TRU_a+TRU_b. And, within the limit, it is possible to adjust RUS of the two priorities. In such a case, it is possible for the UE1 to utilize the RU of 1.5% for the usage of the priority a in the former example.

Additionally, a specific priority may be further regulated in a manner that RU becomes smaller than TRU independently. Particularly, by applying additional regulation to a relatively low priority, it may help a UE prevent a case of giving a load to a channel severely with a low priority only. For example, in case of priority b that is a low priority, an additional condition that RU_b is equal to or smaller than TRU_b may be given. In such a case, although a resource corresponding to TRU_b is available for a transmission of priority a that is a higher priority, an opposite part corresponding to TRU_a is not usable for a transmission of priority b. Particularly, if TRU_a=1% and TRU_b is 0.5%, (RU_a=1.5%, RU_b=0%) is possible but (RU_a=0% and RU_b=1.5%) is impossible.

The above-described operation may be implemented by defining TRU as an upper limit of total RU used by a specific level or a priority equal to or lower than the specific level. In the above example, if TRU'_a=TRU_a+TRU_b and TRU'_b=TRU_b are defined, TRU'_x operates as an upper limit for a sum of RUs used for a transmission of packet equal to or lower than a priority level x. The above-described principle may be represented as Formula 1 in the following. Particularly, according to Formula 1, a total sum of RU for a packet of priority k and RUs of packets having a priority greater than k is smaller than TRU(i.e., a maximum value of an amount of time/frequency resource usable for a transmission in a unit time) set for a packet of the priority k. Particularly, the following TRU(k) means an upper limit of the total RU for enabling a priority of k or a higher priority to use TRU. In Formula 1, a priority index i or k means that a priority gets higher if a value of the priority i or k becomes smaller.

$$\sum_{i \geq k} RU(i) \leq TRU(k) \quad \text{[Formula 1]}$$

By modifying the above-described method, a UE can perform CR in a manner that transmitting a packet of a higher priority is allowed in a situation that a specific resource is determined for a transmission of a specific priority. For example, although a specific sidelink process is mapped to a specific priority, if a UE is in a situation of being unable to transmit a higher priority through another resource at a specific timing (e.g., a situation that all limited resources are already used in a sidelink process mapped to a higher priority), transmitting a packet of a higher priority is allowed. For another example, even in a situation that a specific resource is reserved on the assumption of a specific priority, the specific resource can be utilized in transmitting a packet of a higher priority in the above case.

Figure 9:
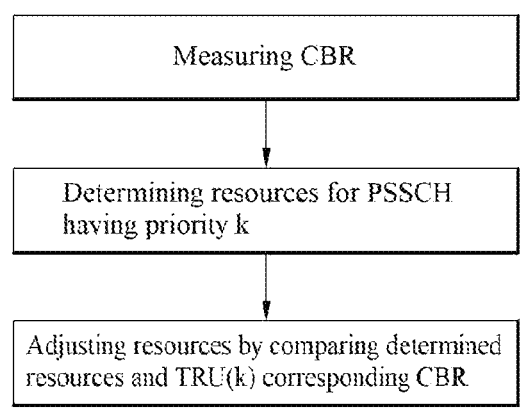
FIG. 9 shows an example of determining an amount of a sidelink resource according to an embodiment of the present invention.

FIG. 9 shows an example of determining an amount of a sidelink resource according to an embodiment of the present invention.

Referring to FIG. 9, for a transmission of PSSCH that is a sidelink data channel in subframe n, a UE measures a CBR in a step 901. Particularly, the CBR measurement is preferably performed at a timing before the subframe n. More preferably, the CBR measurement may be performed in subframe n−4.

Subsequently, in a step 903, the UE determines a resource of PSSCH having a priority k.

Finally, in a step 905, the UE adjusts resources by comparing the determined resource with TRU(k) derived from the measured CBR. Particularly, it should be guaranteed that a total sum of RU for a packet of a priority k and RUs of packets having priorities greater than k is smaller than TRU(k) (i.e., a maximum value of an amount of time/frequency resource usable for a transmission in a unit time) configured for the packet of the priority k. Particularly, TRU(k) means an upper limit of total RU enabling TRU to be used by a priority of k or a priority greater than k.

Figure 10:
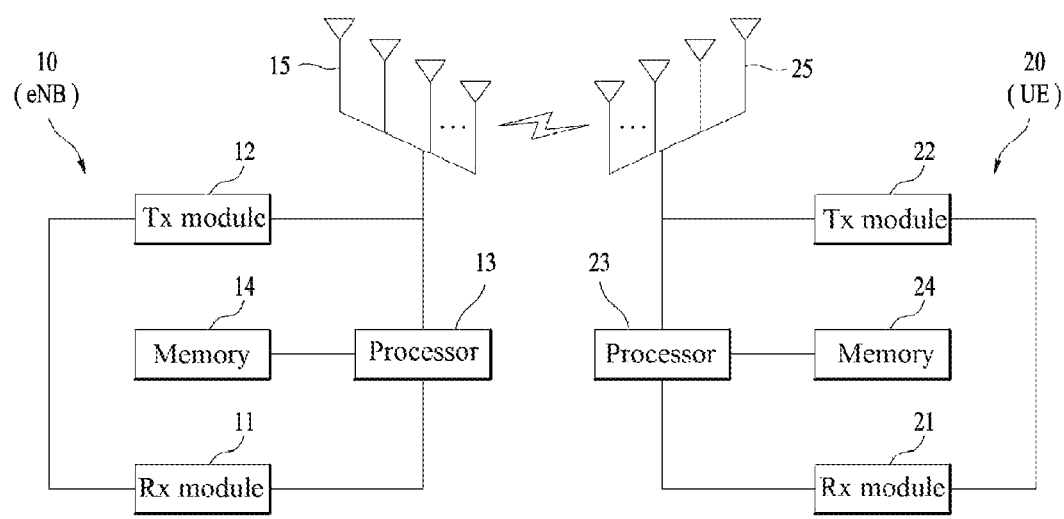
FIG. 10 is a diagram showing configurations of a base station and a user equipment applicable to an embodiment of the present invention.

FIG. 10 is a diagram showing configurations of a base station and a user equipment applicable to an embodiment of the present invention.

Referring to FIG. 10, a base station (eNB) 10 according to the present invention may include an Rx module 11, a Tx module 12, a processor 13, a memory 14 and a plurality of antennas 15. A plurality of the antennas 15 mean a base station supportive of MIMO transmission/reception. The Rx module 11 may receive various signals, data and information in uplink from a User Equipment (UE). The Tx module 12 may transmit various signals, data and information in downlink to the UE. The processor 13 may control overall operations of the base station 10. Particularly, the processor 13 of the base station 10 according to one embodiment of the present invention may process items necessary for the respective embodiments described with reference to FIGS. 1 to 10.

Besides, the processor 13 of the base station 10 may perform functions of processing operations of information received by the base station 10, information to be transmitted by the base station 10 and the like. And, the memory 14 can store the operation-processes information and the like for a prescribed time and may be substituted with components such as a buffer (not shown) and the like.

Referring still to FIG. 10, a User Equipment (UE) 20 according to the present invention may include an Rx module 21, a Tx module 22, a processor 23, a memory 24 and a plurality of antennas 25. A plurality of the antennas 15 mean a user equipment supportive of MIMO transmission/reception. The Rx module 21 may receive various signals, data and information in downlink from the base station. The Tx module 22 may transmit various signals, data and information in uplink to the base station. The processor 23 may control overall operations of the UE 20.

Particularly, the processor 23 of the UE 20 according to one embodiment of the present invention may process items necessary for the respective embodiments described with reference to FIGS. 1 to 10.

Besides, the processor 23 of the UE 20 may perform functions of processing operations of information received by the UE 20, information to be transmitted by the UE 20 and the like. And, the memory 24 can store the operation-processes information and the like for a prescribed time and may be substituted with components such as a buffer (not shown) and the like.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

What is claimed is:

1. A method of transmission using a sidelink data channel by a terminal in a wireless communication system, the method comprising:
   performing a plurality of transmissions on the sidelink data channel using a plurality of resources,
   wherein the plurality of transmissions using the plurality of resources is performed so as to satisfy the condition that:
      for each priority level among a plurality of priority levels for the plurality of transmissions:
         for transmissions having equal or lower priority than the priority level, a sum of resources utilizations for the transmissions is constrained to be equal to or less than a threshold corresponding to the priority level,
         wherein the threshold is related to a maximum limit on resource utilization for transmitting with the priority level on the sidelink data channel.

2. The method of claim 1, wherein satisfying the condition for each priority level among the plurality of priority levels for the plurality of transmissions comprises:
   for a first priority level, and for a first plurality of transmissions having equal or lower priority than the first priority level, a first sum of resources utilizations for the first plurality of transmissions is constrained to be equal to or less than a first threshold corresponding to the first priority level, and
   for a second priority level having lower priority than the first priority level, and for a second plurality of transmissions having equal to or lower priority than the second priority level, a second sum of resource utilizations for the second plurality of transmissions is constrained to be equal to or less than a second threshold corresponding to the second priority.

3. The method of claim 2, wherein a first amount of resources that can use the first priority level for the sidelink data channel is greater than a second amount of resources that can use the second priority level for the sidelink data channel.

4. The method of claim 2, wherein for a third priority level, and for a third plurality of transmissions having the third priority level, a third sum of resource utilizations for the third plurality of transmissions is equal to or less than a third threshold corresponding to the third priority level,
   wherein the third priority level is a lowest priority level among the plurality of priority levels.

5. The method of claim 4, further comprising:
   configuring the first threshold, the second threshold, and the third threshold corresponding to the first priority level, the second priority level, and the third priority level, respectively,
   wherein the first threshold is related to a first maximum limit on resource utilization for transmitting with the first priority level on the sidelink data channel,
   wherein the second threshold is related to a second maximum limit on resource utilization for transmitting with the second priority level on the sidelink data channel, and
   wherein the third threshold is related to a third maximum limit on resource utilization for transmitting with the third priority level on the sidelink data channel.

6. The method of claim 1, wherein based on the sum of resource utilizations for the transmissions having equal to or lower priority than the priority level exceeding the threshold, at least one transmission having the priority level is dropped.

7. The method of claim 1, wherein the maximum limit on resource utilization for transmitting with the priority level depends on a channel busy ratio (CBR) that is related to a ratio of time that the sidelink data channel satisfies a congestion criterion.

8. The method of claim 1, wherein the resource utilization for transmitting with the priority level on the sidelink data channel is related to an aggregate number of sub-channels allocated to the terminal on the sidelink data channel.

9. The method of claim 1, wherein satisfying the condition that, for each priority level among the plurality of priority levels for the plurality of transmissions, and for the transmissions having equal or lower priority than the priority level, the sum of resources utilizations for the transmissions is constrained to be equal to or less than the threshold corresponding to the priority level is represented by the equation:

$$\sum_{i \geq k} RU(i) \leq TRU(k)$$

wherein RU(i) represents a resource utilization for transmissions having a priority level equal to i on the sidelink data channel, and wherein TRU(k) represents a maximum limit on resource utilization for transmitting with a priority level equal to k on the sidelink data channel.

10. The method of claim 1, wherein the sidelink data channel is a Physical Sidelink Shared Channel (PSSCH).

11. A terminal in a wireless communication system, comprising:
a wireless communication module;
at least one processor; and
at least one computer memory operably connectable to the at least one processor and storing instructions that, when executed, cause the at least one processor to perform operations that comprise:
performing a plurality of transmissions on the sidelink data channel using a plurality of resources,
wherein the plurality of transmissions using the plurality of resources is performed so as to satisfy the condition that:
for each priority level among a plurality of priority levels for the plurality of transmissions:
for transmissions having equal or lower priority than the priority level, a sum of resources utilizations for the transmissions is constrained to be equal to or less than a threshold corresponding to the priority level,
wherein the threshold is related to a maximum limit on resource utilization for transmitting with the priority level on the sidelink data channel.

12. The terminal of claim 11, wherein satisfying the condition for each priority level among the plurality of priority levels for the plurality of transmissions comprises:
for a first priority level, and for a first plurality of transmissions having equal or lower priority than the first priority level, a first sum of resources utilizations for the first plurality of transmissions is constrained to be equal to or less than a first threshold corresponding to the first priority level, and
for a second priority level having lower priority than the first priority level, and for a second plurality of transmissions having equal to or lower priority than the second priority level, a second sum of resource utilizations for the second plurality of transmissions is constrained to be equal to or less than a second threshold corresponding to the second priority.

13. The terminal of claim 12, wherein a first amount of resources that can use the first priority level for the sidelink data channel is greater than a second amount of resources that can use the second priority level for the sidelink data channel.

14. The terminal of claim 12, wherein for a third priority level, and for a third plurality of transmissions having the third priority level, a third sum of resource utilizations for the third plurality of transmissions is equal to or less than a third threshold corresponding to the third priority level,
wherein the third priority level is a lowest priority level among the plurality of priority levels.

15. The terminal of claim 14, wherein the operations further comprise:
configuring the first threshold, the second threshold, and the third threshold corresponding to the first priority level, the second priority level, and the third priority level, respectively,
wherein the first threshold is related to a first maximum limit on resource utilization for transmitting with the first priority level on the sidelink data channel,
wherein the second threshold is related to a second maximum limit on resource utilization for transmitting with the second priority level on the sidelink data channel, and
wherein the third threshold is related to a third maximum limit on resource utilization for transmitting with the third priority level on the sidelink data channel.

16. The terminal of claim 11, wherein the operations further comprise:
based on the sum of resource utilizations for the transmissions having equal to or lower priority than the priority level exceeding the threshold, dropping at least one transmission having the priority level.

17. The terminal of claim 11, wherein the maximum limit on resource utilization for transmitting with the priority level depends on a channel busy ratio (CBR) that is related to a ratio of time that the sidelink data channel satisfies a congestion criterion.

18. The terminal of claim 11, wherein the resource utilization for transmitting with the priority level on the sidelink data channel is related to an aggregate number of sub-channels allocated to the terminal on the sidelink data channel.

19. The terminal of claim 11, wherein satisfying the condition that, for each priority level among the plurality of priority levels for the plurality of transmissions, and for the transmissions having equal or lower priority than the priority level, the sum of resources utilizations for the transmissions is constrained to be equal to or less than the threshold corresponding to the priority level is represented by the equation:

$$\sum_{i \geq k} RU(i) \leq TRU(k)$$

wherein RU(i) represents a resource utilization for transmissions having a priority level equal to i on the sidelink data channel, and wherein TRU(k) represents a maximum limit on resource utilization for transmitting with a priority level equal to k on the sidelink data channel.

20. The terminal of claim 11, wherein the sidelink data channel is a Physical Sidelink Shared Channel (PSSCH).

* * * * *